(12) United States Patent
Imaoka et al.

(10) Patent No.: US 7,746,569 B2
(45) Date of Patent: Jun. 29, 2010

(54) IMAGING DEVICE

(75) Inventors: Takuya Imaoka, Kanagawa (JP); Kimio Tokuda, Kanagawa (JP); Hiroshi Nishizawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 188 days.

(21) Appl. No.: 12/089,761

(22) PCT Filed: Sep. 27, 2006

(86) PCT No.: PCT/JP2006/319120
§ 371 (c)(1),
(2), (4) Date: Apr. 10, 2008

(87) PCT Pub. No.: WO2007/046217
PCT Pub. Date: Apr. 26, 2007

(65) Prior Publication Data
US 2009/0168190 A1    Jul. 2, 2009

(30) Foreign Application Priority Data
Oct. 17, 2005    (JP)    ............................. 2005-302011

(51) Int. Cl.
*G02B 27/00*    (2006.01)
(52) U.S. Cl. ...................................... 359/739; 359/754

(58) Field of Classification Search ......... 359/652–655, 359/738–740, 754–795
See application file for complete search history.

(56) References Cited

U.S. PATENT DOCUMENTS

| | | | | |
|---|---|---|---|---|
| 5,392,431 | A | * | 2/1995 | Pfisterer ...................... 359/653 |
| 5,999,327 | A | * | 12/1999 | Nagaoka ...................... 359/654 |
| 7,126,762 | B2 | * | 10/2006 | Yoshitsugu .................. 359/687 |

FOREIGN PATENT DOCUMENTS

| | | |
|---|---|---|
| JP | 08-320517 | 12/1996 |
| JP | 2002-123825 | 4/2002 |
| JP | 2003-270526 | 9/2003 |

* cited by examiner

*Primary Examiner*—Darryl J Collins
(74) *Attorney, Agent, or Firm*—Pearne & Gordon LLP

(57) ABSTRACT

It is an object of the present invention to provide an imaging device that, even if the optical axis of the multifocal lens has a deviation resulting from its decentered surfaces, can prevent an image from being deteriorated by the low precision lens. The imaging device comprises a solid state image sensor for taking an image of an object to produce an image signal indicative of the image, an aspherical single focus lens, a bifocal lens disposed in front of the solid state image sensor, the bifocal lens having two focal distances, and an aperture diaphragm located just before the bifocal lens.

4 Claims, 4 Drawing Sheets

IMAGING DEVICE

TECHNICAL FIELD OF THE INVENTION

The present invention relates mainly to a compact imaging device, and more particularly to an imaging device provided with a multifocal lens.

DESCRIPTION OF THE RELATED ART

Up until now, there have been proposed a wide variety of imaging devices of this type, one typical example of which is disclosed in a patent document 1. The conventional imaging device disclosed in the patent document 1 is adapted to obtain a high-resolution image from an image taken through a bifocal lens. The bifocal lens of the conventional imaging device disclosed in the patent document 1 has two portions disposed in a concentric fashion and axially aligned with each other, or has two semicircular portions.

The conventional camera disclosed in the patent document 2 is adapted to switch between two lens units different in focal length from each other. The conventional camera disclosed in the patent document 2 has a state in which one of the lens units is located in front of an aperture diaphragm, and a state in which the other of the lens units is located in back of the aperture diaphragm.

Patent document 1: Japanese unexamined patent publication No. 2002-123825

Patent document 2: Japanese unexamined patent publication No. H08-320517

DISCLOSURE OF THE INVENTION

Problems to be Solved by the Invention

It is essential to improve, in size or particularly in thickness, a camera module to be mainly built in a mobile phone by using the above-mentioned aspheric bifocal lens.

Needless to say, a high precision lens is applied to a thin-model camera module. However, it is important to prevent an image from being affected by a relatively-low precision lens under the condition that the relatively-low precision lens is applied to the thin-model camera module, and to improve effects of the relatively-low precision lens by using an aperture diaphragm for adjusting light to be received by a solid state image sensor.

It is an object of the present invention to provide an imaging device, even if the multifocal lens has a deviated optical axis resulting from its decentered surfaces, which can prevent an image from being affected by the deviated optical axis of the multifocal lens.

Means for Solving the Problems

The imaging device according to the present invention, comprises: a solid state image sensor; at least two lenses; and an aperture diaphragm for adjusting light to be received by the solid state image sensor, wherein one of the lenses is constituted by a multifocal lens having two or more portions different in focal length from one another, the aperture diaphragm is located just before the multifocal lens.

The imaging device thus constructed, even if the multifocal lens has a deviated optical axis resulting from its decentered surfaces, can prevent an image from being affected by the deviated optical axis of the multifocal lens by reason that the light adjusted or limited by the aperture diaphragm located just before the multifocal lens is received by the solid state image sensor through the bifocal lens.

In the imaging device according to the present invention, the multifocal lens may be constituted as an aspherical lens, the multifocal lens having two or more portions arranged in a concentric fashion, the potions has respective axes aligned with one another.

It is easy to adjust a back-focus to focus on an object by reason that the lens retaining member is engaged with the housing by engaging means, which is known to those skilled in the art, such as for example screw and nut, the lens retained by the lens retaining member is moved with respect to the solid state image sensor when the lens retained by the lens retaining member is rotated around its optical axis.

In the imaging device according to the present invention, the multifocal lens may be constituted by a lens made of glass.

In the imaging device thus constructed, multifocal lens made of glass has greater flexibility in refractive index, Abbe's number and the like in comparison with multifocal lens made of plastic, and expands the design possibility.

In the imaging device according to the present invention, the multifocal lens may be constituted by a lens made of plastic.

The imaging device thus constructed can be reduced in weight by reason that the lens made of plastic is smaller in density than the lens made of glass.

Advantageous Effect of the Invention

The imaging device according to the present invention, even if the multifocal lens has a deviated optical axis resulting from its decentered surfaces, can prevent an image from being affected by the deviated optical axis of the multifocal lens by reason that the light adjusted or limited by the aperture diaphragm located just before the multifocal lens is received by the solid state image sensor through the bifocal lens.

EXPLANATION OF THE REFERENCE NUMERALS

Figure 1:
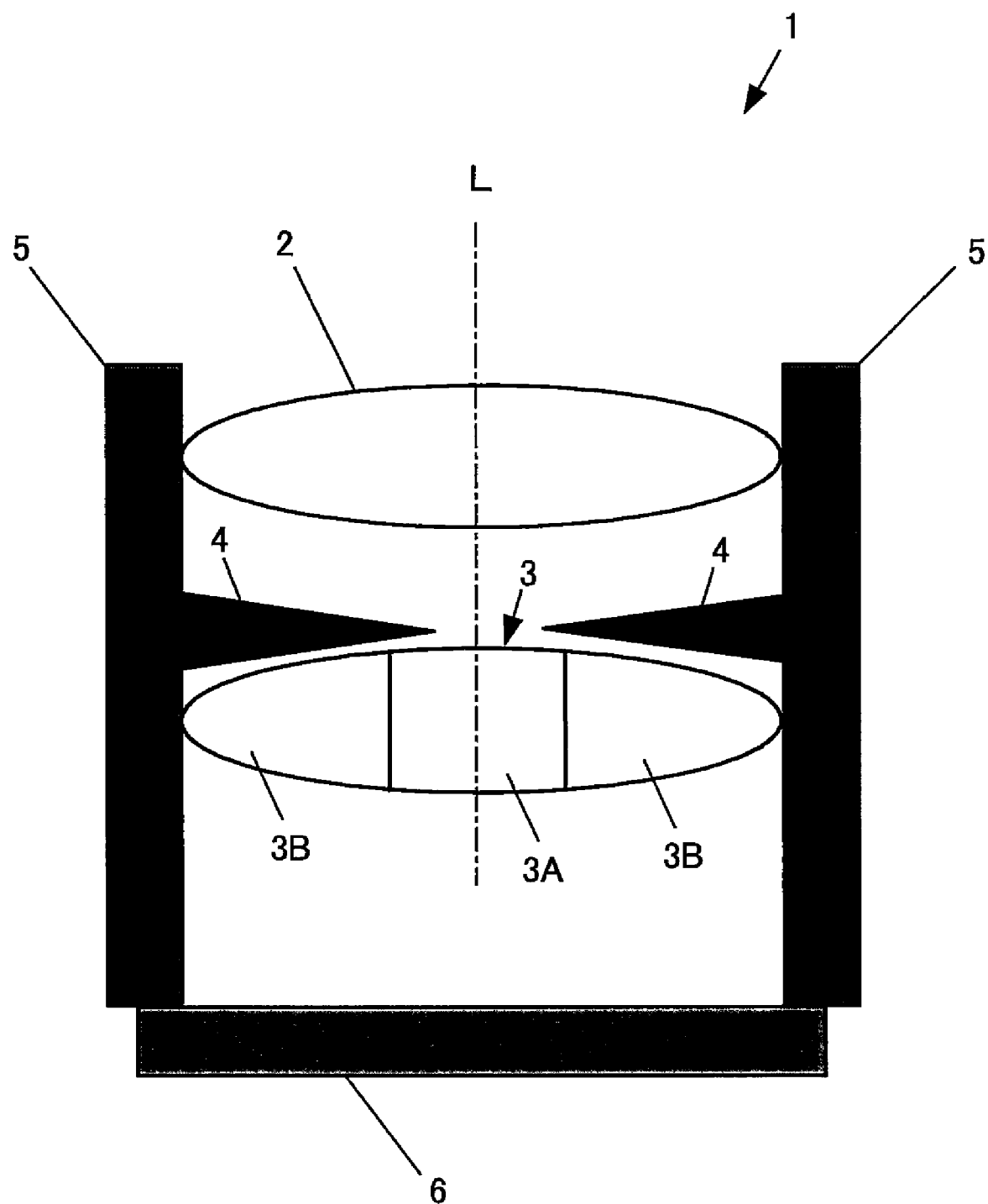
FIG. 1 is a sectional view showing a main section of an imaging device according to an embodiment of the present invention.

1: imaging device
2: single focus lens
3: bifocal lens
3A: long focus portion
3B: short focus portion
4: aperture diaphragm
5: housing
6: solid state image sensor
7a, 7b: simulation results

DETAILED DESCRIPTION OF THE INVENTION

An embodiment of the imaging device according to the present invention will be described hereinafter with reference to the accompanying drawings.

FIG. 1 is a sectional view showing a main section of the imaging device according to the embodiment of the present invention. As shown in FIG. 1, the imaging device 1 comprises an aspherical single focus lens 2 accommodated in a housing 5, and an aspherical multifocal lens 3 accommodated in the housing 5 and located at a predetermined distance from the aspherical single focus lens 2 under the condition that the aspherical lens 3 is axially aligned with the aspherical single focus lens 2. In this embodiment, the aspherical multifocal lens 3 is constituted by a bifocal lens having two different focus lengths.

The bifocal lens 3 has a long focus portion 3A and a short focus portion 3B smaller in focal length than the long focus portion 3A. The long and short focus portions 3A and 3B are located in a concentric fashion, and constituted as one lens.

As shown in FIG. 1, the imaging device 1 further comprises a solid state image sensor 6 located at the bottom of the housing 5. The bifocal lens 3 is located in front of the solid state image sensor 6. The aperture diaphragm 4 is located just before the bifocal lens 3. The housing 5 has an infrared cut filter (not shown) accommodated therein. The infrared cut filter is operable to remove an infrared light component from a light to be received by the solid state image sensor 6.

In this embodiment, the imaging device comprises a single focus lens 2 and a bifocal lens 3 made of acrylic plastic such as for example ZEONEX (registered trademark). The single focus lens 2 and the bifocal lens 3 are retained by a lens retaining member (not shown), and adhered to the lens retaining member under the condition that the single focus lens 2 and the bifocal lens 3 are separated from each other by a predetermined distance. The lens retaining member is engaged with the housing 5 by engaging means such as for example screw and nut. The lenses retained by the lens retaining member are moved with respect to the solid state image sensor 6 when the lenses retained by the lens retaining member are rotated around its optical axis.

The operation of the imaging device according to the embodiment of the present invention will then be described hereinafter.

Light from an object is firstly passed through the single focus lens 2, limited by the aperture diaphragm 4, and then passed through two portions of the bifocal lens 3. The light passed through the portions of the bifocal lens 3 forms two images corresponding to the respective portions of the bifocal lens 3, and depending on the respective focal lengths of the portions of the bifocal lens 3. Infrared component of the light is eliminated or limited by an infrared cut filter (not shown). When the light is received by the solid state image sensor 6, the photoelectric conversion of the light to an image signal is performed in the solid state image sensor 6.

The image signal to be outputted to a circuit (not shown) from the solid state image sensor 6 has a component resulting from the long focus portion 3A of the bifocal lens 3 and a component resulting from the short focus portion 3B of the bifocal lens 3. The circuit (not shown) processes the image signal to obtain a clear image from an original image represented by the image signal by reforming an image deblurring of the original image on the basis of a method disclosed in the patent document 1 or another conventional method.

Additionally, each pixel of the solid state imaging device 6 of the imaging device according to the embodiment of the present invention measures 2.8 by 2.8 $\mu m^2$. The solid state imaging device 6 has 1.3 million pixels (Super Extended Graphics Array) based on Bayer arrangement of fundamental color filters, and performs a progressive scanning at a rate of 15 frames per second. An angle of incident light passed through the single focus lens 2 is limited by the aperture diaphragm 4.

Figure 2:
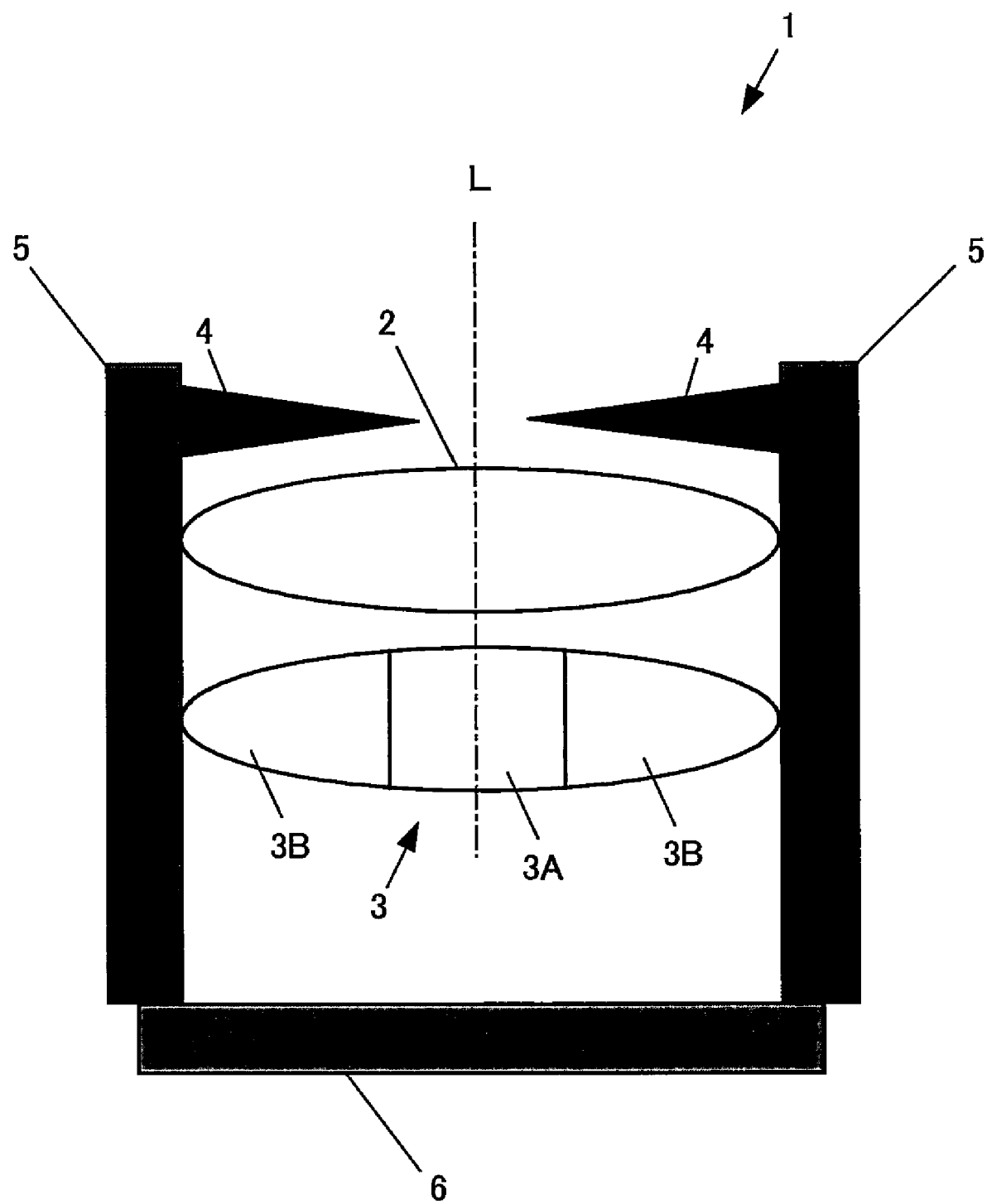
FIG. 2 is a sectional view showing a main section of a conventional imaging device.

FIG. 2 is a diagram showing a conventional imaging device in which the aperture diaphragm 4 is across the single focus lens 2 from the solid state imaging device 6.

Figure 3:
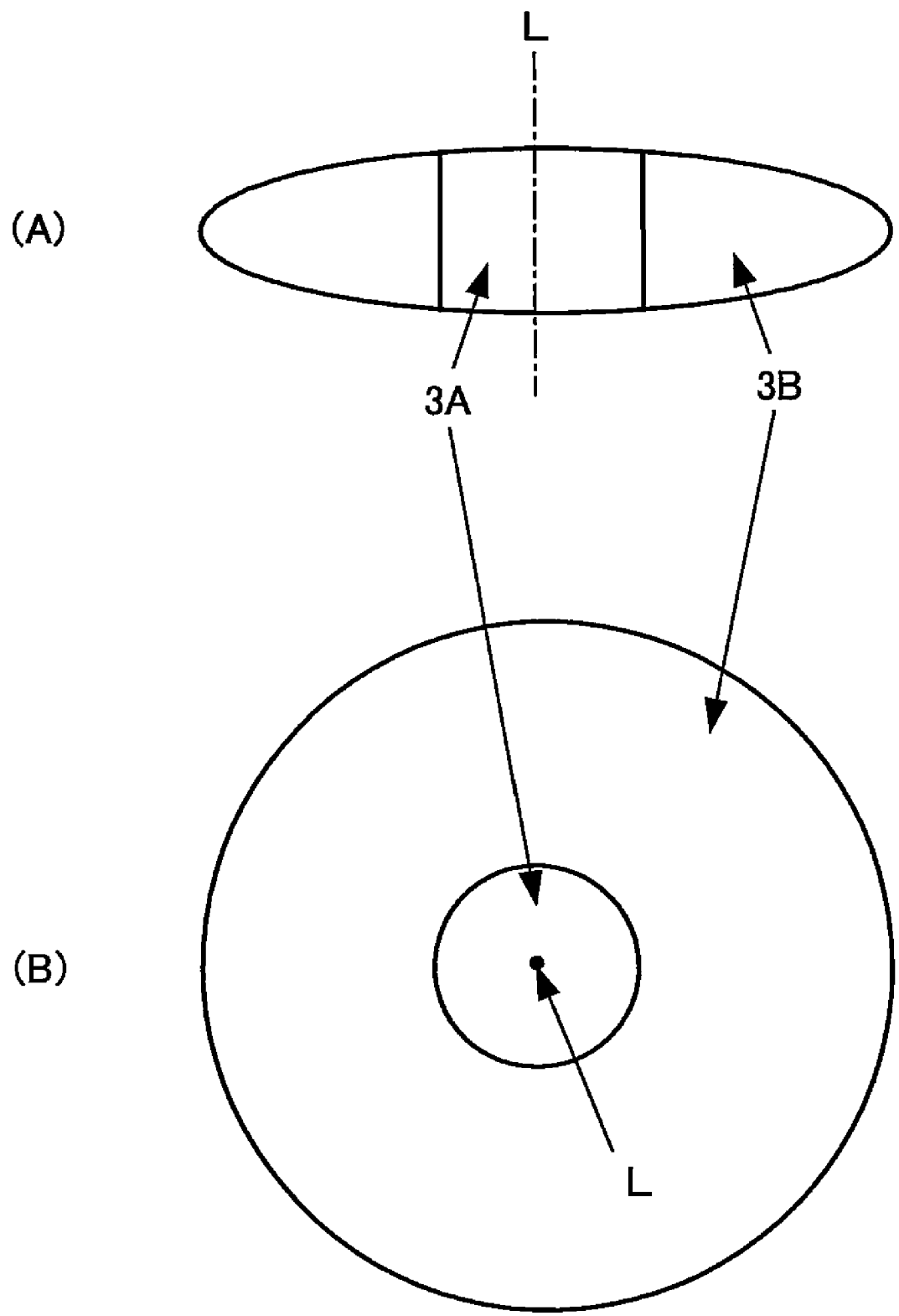
FIG. 3 is a diagram showing a bifocal lens of the imaging device according to the embodiment of the present invention.

FIG. 3 is a diagram showing a general construction of a bifocal lens 3 of the imaging device according to the embodiment of the present invention. FIG. 3(A) is a sectional view showing the bifocal lens 3. FIG. 3(B) is a plan view showing the bifocal lens 3. The bifocal lens 3 has a long focus portion 3A and a short focus portion 3B smaller in focal length than the long focus portion 3A. The long focus portion 3A and the short focus portion 3B are located in a concentric fashion, axially aligned with each other, and constituted as one lens.

In this embodiment, the long focus portion 3A has a focus length of 3.8 mm. The short focus portion 3B has a focus length of 3.6 mm. The long focus portion 3A is the same in position of exit pupil and f-number as the short focus portion 3B. Therefore, the image information to be received through the long focus portions 3A is substantially the same as that to be received through the image information to be received through the short focus portions 3B.

The long focus portion 3A and the short focus portion 3B are different in focus length from each other, the same in refractive index as each other, and different in curvature from each other. The bifocal lens 3 has a discontinuous surface at a boundary between the long focus portion 3A and the short focus portion 3B. Therefore, ghost, flare, and the like resulting from a reflection at the discontinuous surface increase with an angle of incident light to the bifocal lens 3.

It is an object of the present invention to provide an imaging device 1 to be built into a mobile phone as a camera module. Therefore, it is preferable to improve in thickness the camera module to be built in the mobile phone. In order to improve in thickness the mobile phone, it is important to improve in thickness an optical section of the camera module by using highly refractive material, or by changing an angle of incident light. Therefore, it is preferable to limit an angle of incident light by improving the conventional imaging device shown in FIG. 2 to locate the aperture diaphragm 4 just before the bifocal lens as shown in FIG. 1.

In general, the bifocal lens 3, in which the optical axis L of the long focus portion 3A is axially aligned with that of the short focus portion 3B, is produced by an injection molder in a manufacturing step. The molded lens has an optical axis affected by the flow of plastic injected in a molding step, the shrinkage anisotropy of plastic, the temperature distribution of platen of the molder, and the like.

We have simulated a required accuracy of an optical axis of the bifocal lens 3. The simulation results are as follows. The deviation of the optical axis of the bifocal lens 3 is allowable, even if the optical axis of the bifocal lens 3 is shifted by 16 µm or less, under the condition that the aperture diaphragm 4 is located just before the bifocal lens 3 as shown in FIG. 1. On the other hand, the displacement of the bifocal lens 3 is equivalent to one pixel when the optical axis of the bifocal lens 3 is shifted by 1.5 µm under the condition that the aperture diaphragm 4 is located just before the single focal lens 3 as shown in FIG. 2.

From the foregoing description, it will be understood that it is easy to manufacture the imaging device improved in thickness by reason that the imaging device has a broadened allowable range to the deviation of the optical axis of the bifocal lens 3 under the condition that the aperture diaphragm 4 is located just before the bifocal lens 3.

Figure 4:
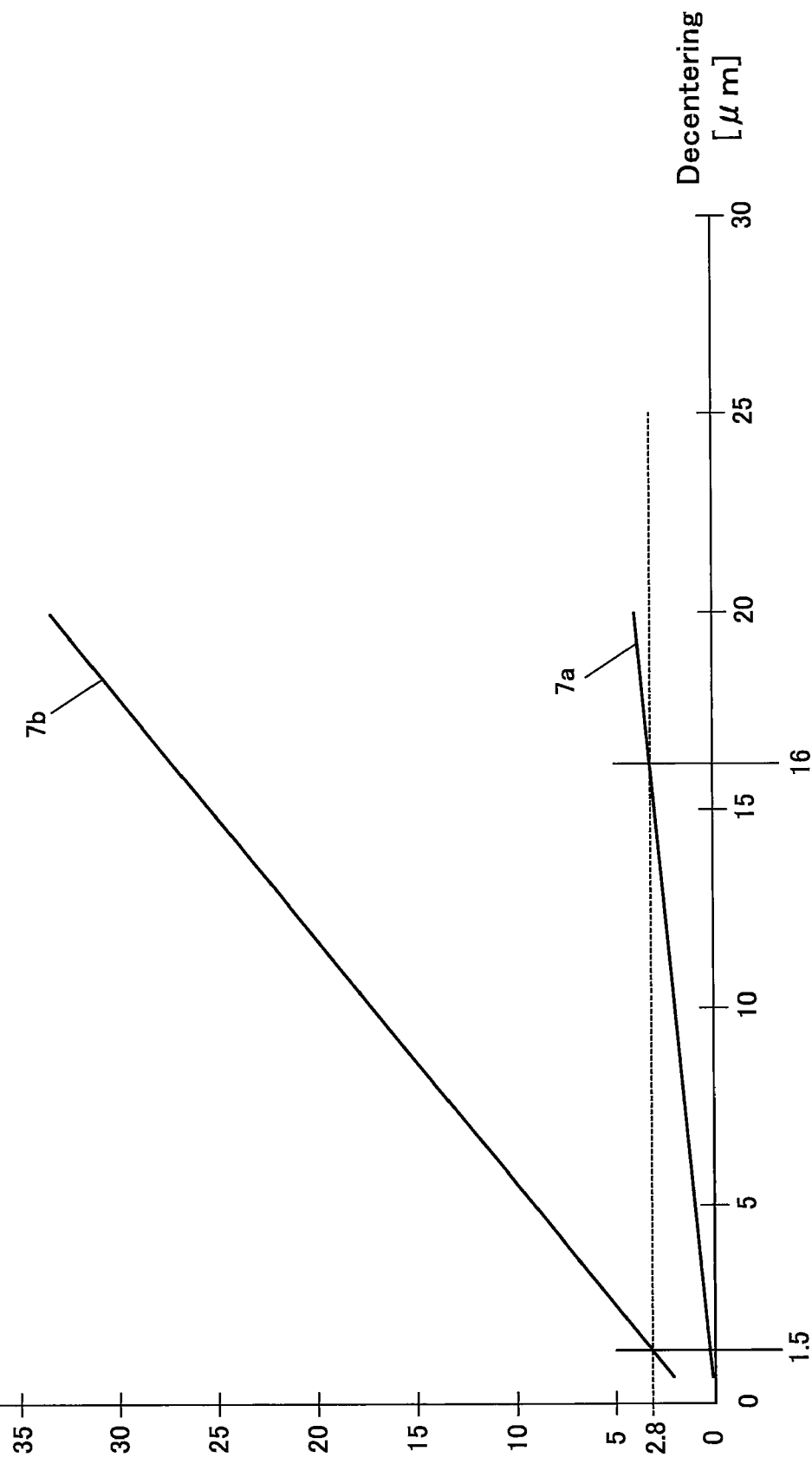
FIG. 4 is a graph showing a relationship between the displacement of each pixel and the decentering of the lens.

FIG. 4 is a graph showing, as simulation results, a relationship between the deviation of the optical axis of the bifocal lens 3 and the displacement of pixel on the solid state imaging sensor 6. In FIG. 4, the lateral axis of this graph corresponds to the deviation of the optical axis of the bifocal lens 3. The longitudinal axis of this graph corresponds to the dislocation of the image. A broken line shown in FIG. 4 corresponds to a dislocation of 2.8 μm, i.e. a dislocation of one pixel.

Here, the simulation result 7a corresponds to the imaging device 1 shown in FIG. 1 as the embodiment of the present invention, while the simulation result 7b corresponds to the conventional imaging device 1 shown in FIG. 2. From FIG. 4, it will be understood that the imaging device 1 according to the present invention can be improved in robustness under the condition that the aperture diaphragm 4 is located just before the bifocal lens 3, and prevent an image from being affected by the deviation of the optical axis of the bifocal lens 3.

When the back-focus is adjusted, the lens retaining member engaged with the housing 5 by screw and nut is rotated around the optical axis. The imaging device 1 can be improved in yield, even if the lens retaining member is rotated around the optical axis when the back-focus is adjusted in a manufacturing process, by reason that the single focus lens 2 has rotational symmetries with respect to an optical axis, the bifocal lens 3 is acceptable under the condition that the deviation of the optical axis of the bifocal lens 3 is within 16 μm or less. In general, the deviation of the optical axis of the molded bifocal lens is not more that 5 μm, and within an allowable range. Therefore, the molded bifocal lens manufactured on the basis of a general standard can be applied to the imaging device according to the present invention.

In this embodiment, the imaging device comprises a single focus lens 2 made of plastic and a bifocal lens 3 made of plastic. The imaging device may comprise one or more molded aspherical glass lenses. In general, glass lens has the flexibility in refractive index and Abbe's number greater than plastic lens. Therefore, the imaging device has wide flexibility in layout by comprising one or more molded aspherical glass lenses, and can be used within a wide temperature range by reason that glass lens has low linear expansion coefficient in comparison with plastic lens.

INDUSTRIAL APPLICABILITY OF THE PRESENT INVENTION

As will be seen from the foregoing description, the imaging device according to the present invention, even if the optical axis of the multifocal lens has a deviation resulting from its decentered surfaces, can prevent an image from being deteriorated by the low precision lens by reason that the light adjusted or limited by the aperture diaphragm located just before the multifocal lens is received by the solid state image sensor through the bifocal lens.

The invention claimed is:

1. An imaging device, comprising:
    a solid state image sensor;
    at least two lenses; and
    an aperture diaphragm for adjusting light to be received by said solid state image sensor, wherein
    one of said lenses is constituted by a multifocal lens having two or more portions different in focal length from one another, the same in f-number as one another, and the same in refractive index as one another,
    said aperture diaphragm is located just before said multifocal lens,
    said lenses are retained by a lens retaining member which is moved with respect to said solid state image sensor when said lens retaining member is rotated around a center axis.

2. An imaging device as set forth in claim 1, wherein said multifocal lens is constituted as an aspherical lens, said multifocal lens having two or more portions arranged in a concentric fashion.

3. An imaging device as set forth in claim 1, wherein said multifocal lens is constituted by a lens made of glass.

4. An imaging device as set forth in claim 1, wherein said multifocal lens is constituted by a lens made of plastic.

* * * * *